(12) United States Patent
White

(10) Patent No.: US 9,898,940 B2
(45) Date of Patent: Feb. 20, 2018

(54) LADDERLESS CLEAT AND TRACK BANNER HANGER FOR VERTICAL SURFACE

(71) Applicant: Michael J. White, Ripon, WI (US)

(72) Inventor: Michael J. White, Ripon, WI (US)

(73) Assignee: K-International, Inc., Ripon, WI (US)

( * ) Notice: Subject to any disclaimer, the term of this patent is extended or adjusted under 35 U.S.C. 154(b) by 237 days.

(21) Appl. No.: 14/664,154

(22) Filed: Mar. 20, 2015

(65) Prior Publication Data

US 2016/0275828 A1    Sep. 22, 2016

(51) Int. Cl.
| G09F 7/18 | (2006.01) |
| F16M 13/02 | (2006.01) |
| G09F 17/00 | (2006.01) |
| G09F 19/22 | (2006.01) |
| F16B 1/00 | (2006.01) |
| F16B 47/00 | (2006.01) |

(52) U.S. Cl.
CPC ............... *G09F 7/18* (2013.01); *F16M 13/02* (2013.01); *G09F 17/00* (2013.01); *G09F 19/22* (2013.01); *F16B 47/00* (2013.01); *F16B 2001/0035* (2013.01); *G09F 2007/1847* (2013.01)

(58) Field of Classification Search
CPC ........... G09F 7/20; A47G 1/16; A47G 1/1606; A47G 1/1686
USPC ...... 40/617, 601, 544, 475.1, 459, 489, 323; 248/489, 323
See application file for complete search history.

(56) References Cited

U.S. PATENT DOCUMENTS

| 3,477,757 A * | 11/1969 | English | A47F 11/00 294/210 |
| 4,821,437 A * | 4/1989 | Abramson | G09F 3/20 40/651 |
| 5,065,537 A * | 11/1991 | Bailey | G09F 7/12 294/211 |
| 7,237,351 B1 * | 7/2007 | Fehring | G09F 1/10 40/611.01 |
| 8,104,207 B2 * | 1/2012 | Pitcher | G09F 7/20 248/323 |
| D742,970 S * | 11/2015 | White | D20/43 |

(Continued)

FOREIGN PATENT DOCUMENTS

| CH | 703496 A2 * | 2/2012 | A47B 97/02 |
| FR | 2926915 A1 * | 7/2009 | G09F 7/18 |

(Continued)

*Primary Examiner* — Cassandra H Davis
(74) *Attorney, Agent, or Firm* — Schiff Hardin LLP

(57) ABSTRACT

A track and cleat system includes a track attached by suction cups or other means to a window or other vertical surface. The track has a projection onto which a cleat is attached. The cleat includes a track receiving opening that fits onto the track. A banner holder is provided adjacent to the track receiving opening. The banner holder may use friction grips or magnets to hold a banner, sign or display. The cleat has an offset grip portion in a T-shape that is spaced from the banner holder and gripped by a gripper on a pole to move the banner and cleat to a display position on the track and to remove the banner and cleat from the display position by removing the cleat from the track. Various banner holding devices are provided, as well as various track and cleat shapes and various means of attachment.

20 Claims, 16 Drawing Sheets

(56) References Cited

U.S. PATENT DOCUMENTS 9,697,754 B2 * 7/2017 White .................. G09F 7/18
2008/0190001 A1 * 8/2008 Gabbert ................ A47G 1/06
40/781

FOREIGN PATENT DOCUMENTS

FR 2936896 A1 * 4/2010 ............. G09F 1/103
GB 2326429 A * 12/1998 .......... E04F 19/0463

* cited by examiner

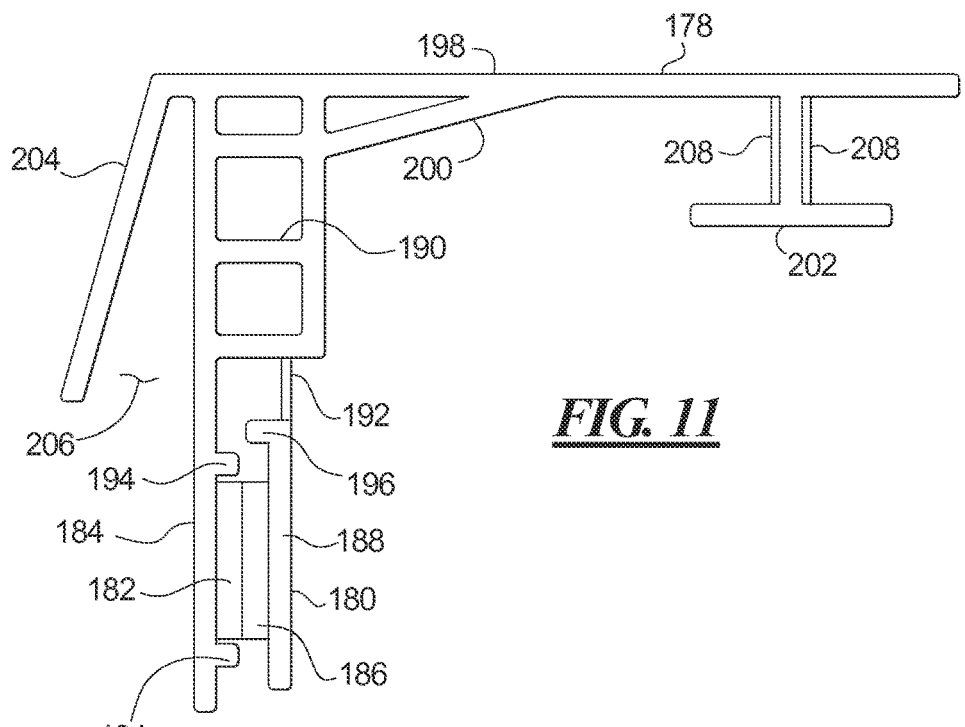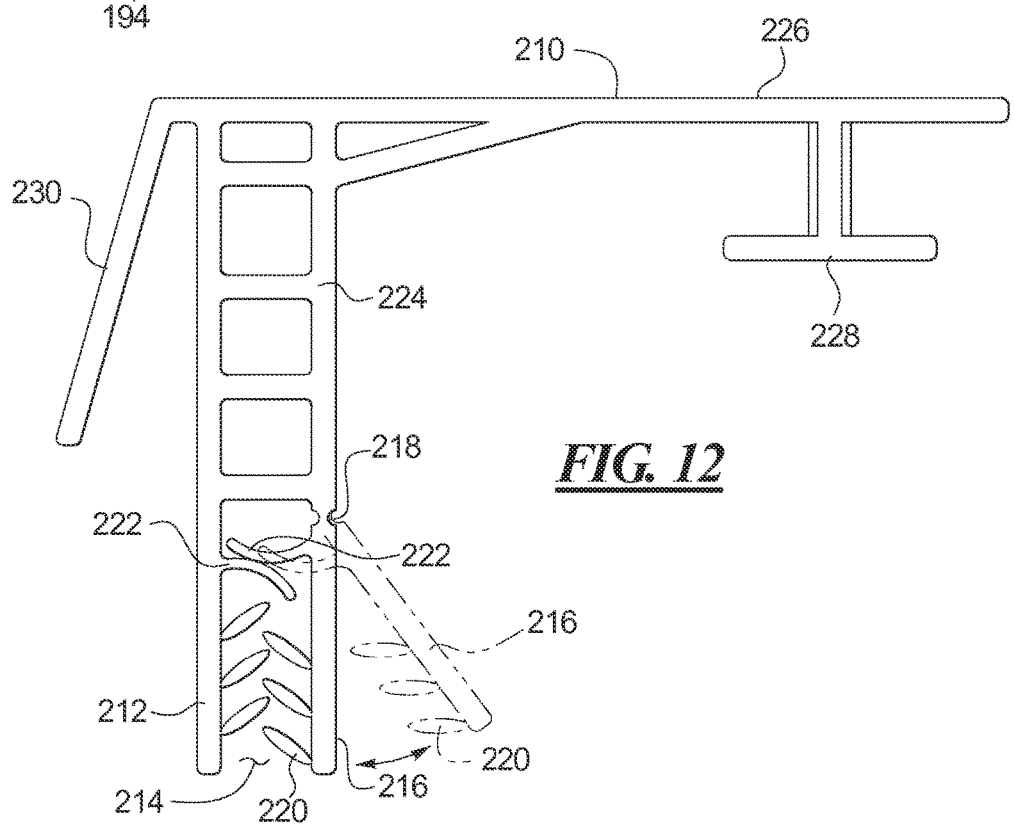

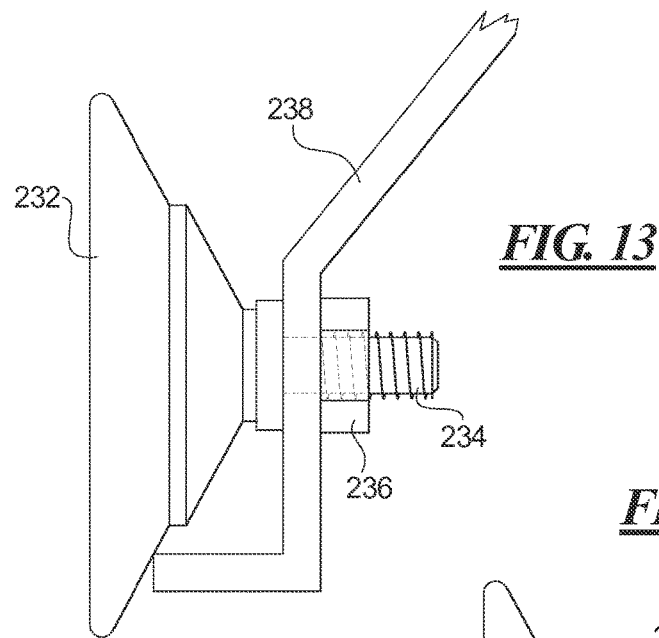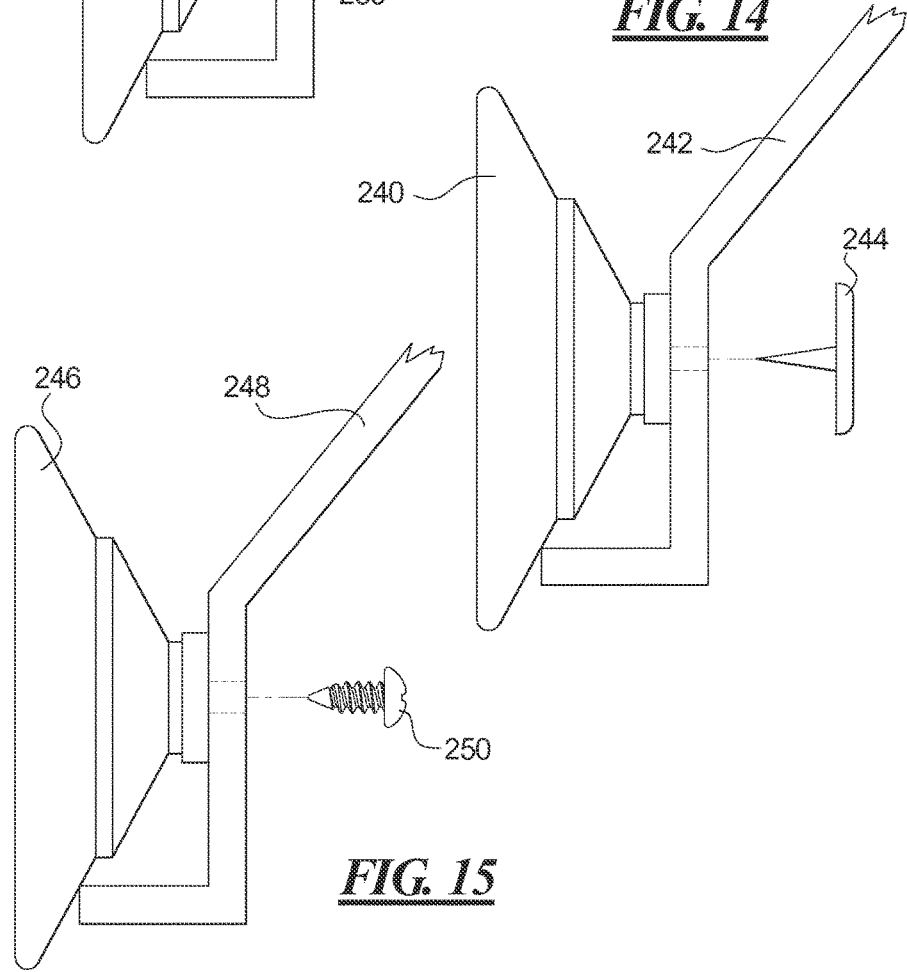

LADDERLESS CLEAT AND TRACK BANNER HANGER FOR VERTICAL SURFACE

BACKGROUND OF THE INVENTION

Field of the Invention

The present invention relates generally to a banner hanger, and more particularly to a banner hanger configured for hanging a banner on a vertical surface.

Description of the Related Art

Stores, restaurants, and other businesses, community centers, recreational centers, government buildings, rental and sales offices, and other buildings regularly hang banners and signs in windows. The banners and signs may advertise a product offered in the store, a special event such as a sale, or provide information or provide a decorative display. Decorative displays may be related to a holiday, store (grand) opening or closing (going out of business, or store moving) event, or other event.

Signs, banners, and displays hung in windows may be affixed by tape or other adhesive or may be affixed by suction cups or the like. Tape can be hard to remove. Either method of affixing the sign, banner or display may require climbing on a ladder or stool to reach the desired position for the window sign or display. In restaurants, for example, hanging the sign may require someone climbing on a chair or in a booth in the restaurant to reach the desired position for hanging the sign or display.

Signs, banners, and displays are also regularly hung on walls at locations requiring that the person hanging the sign, banner or display climb a ladder or step stool.

SUMMARY OF THE INVENTION

The present invention provides a hanger for hanging a sign, banner or display on a window or other vertical surface. The hanger includes one or more tracks that are attached to the vertical surface. The hanger also includes a cleat that engages the one or more tracks. The cleat includes an engagement portion for engaging a sign, banner or display and supporting the sign, banner or display while the cleat is engaged on the one or more tracks. The cleat of certain embodiments includes an offset grip member for engagement by a gripper during mounting and un-mounting of the cleat on the one or more tracks.

The engagement portion may be configured in any of several different ways to engage one or more signs, banners, displays, posters or the like. The one or more tracks may be configured for attachment to a window or other smooth surface such as by suction cups. It is also foreseen that the one or more tracks may be attached to a vertical surface by other fasteners or attachment means such as wall anchors.

The track and cleat hanger of certain embodiments is configured for mounting and un-mounting using a gripper that avoids use of a ladder, step stool, bench, chair, crate, or other item for the user to step on while reaching the mounting location. The banner hanger may hang a banner at a prominent vertical location while the user's feet remain safely on the floor.

BRIEF DESCRIPTION OF THE DRAWINGS

FIG. 11 is another embodiment of a cleat with a magnetic gripper;

FIG. 12 is another embodiment of a cleat with a hinged gripper;

FIGS. 13, 14, 15, 16, 17, 18, and 19 are embodiments of suction cups for mounting the track;

DETAILED DESCRIPTION OF THE PREFERRED EMBODIMENTS

Figure 1:
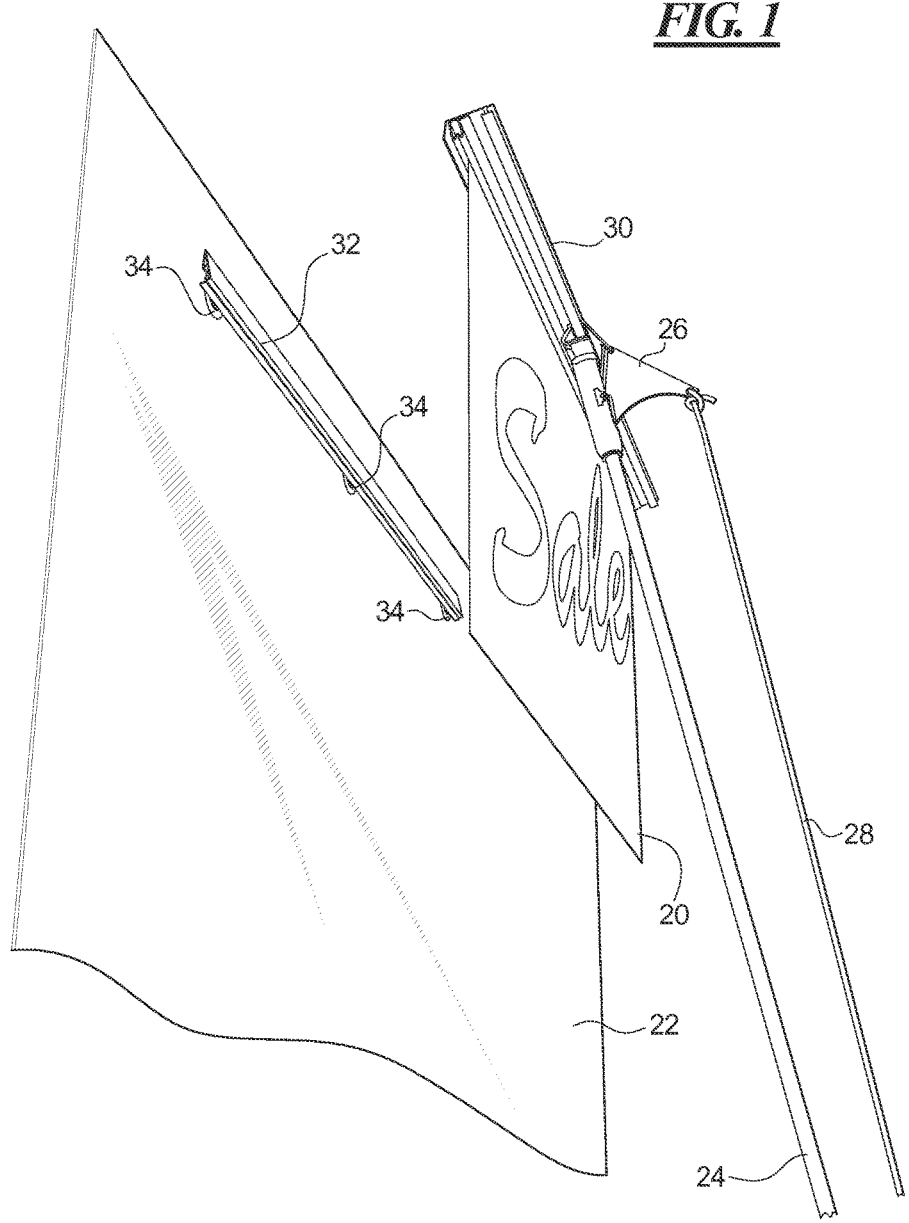
FIG. 1 is a bottom perspective view of a sign being hung on a window or other vertical surface using a gripper and pole, the view also showing the removal of the sign from the window or other vertical surface.

In FIG. 1, a user is hanging a banner, sign or display 20 on a window or other vertical surface 22. The banner, sign or display 20 may be any sign, banner, poster, display, or the like, and may be referred to hereinafter generally as a banner. The window or other vertical surface 22 may be a window visible from outside a building or facility, or may be a window, such as a window between a store and an interior of a shopping mall. The window or vertical surface 22 may be a transparent, translucent or opaque wall, including a wall of drywall, tile, plaster, paneling, glass, or other wall material. The banner 20 may include information on a surface facing the window so that the information may be visible through the window. The banner 20 may include information on an inside surface, such as information visible from within a building or room in which the banner 20 is hung or the banner 20 may have information on both surfaces.

A user, who may be a store, restaurant, or facility employee, seeks to hang the banner 20 on the window 22 at a prominent location. The user utilizes an elongated pole 24 on the end of which is a gripper 26 that is engaged and disengaged using a rope or cord 28. The user has used the gripper 26 to grasp a cleat 30 in which the banner 20 is suspended. The cleat 30 is lifted into place adjacent a track 32 that has been attached to the window or other vertical surface 22. The cleat 30 and banner 20 may be moved to a prominent location, such as high on a window, without the use of a ladder, crate, step stool, chair, bench or other item for the user to stand on. A different banner 20 may be hung and removed at the window 22 or other vertical surface as frequently as required.

The FIG. 1 also illustrates the banner 20 being removed from the hanging position at the window 22 by the user using the pole 24 and gripper 26. The user grasps the cleat 30 using the gripper without the use of a ladder and lifts the cleat 30 from the track 32. The cleat 30 and banner 20 may be brought to a lower, convenient location for removal of the banner 20 from the cleat 30. The gripper 26 and pole 24 may also be used to reposition the banner 20, such as to move it from side-to-side on the track 32 to center it on the window 22, for example.

The track 32 is attached to the window 22 or other vertical surface by suction cups 34. The suction cups 34 are attached to the window 22 by pressing in place, potentially by also dampening the suction cups first. Any number or arrangement of suction cups 34 may be provided. Other fastening or mounting means may be provided instead or in addition to the suction cups, including adhesive, double sided tape, nails, screws, bolts, anchors, or other means and devices for mounting to a surface, such as a window or wall surface.

A single lifting motion for mounting the banner 20 is possible using a single lifting pole by a single user. A single removing motion for un-mounting the banner using a single lifting pole by a single user is also possible.

The surface to which the track is attached is described herein as vertical. The surface may be a vertical surface or a surface inclined at an angle, or slope. The surface may be at any orientation or angle, including a horizontal surface, all of which are within the scope of the present invention.

Figure 2:
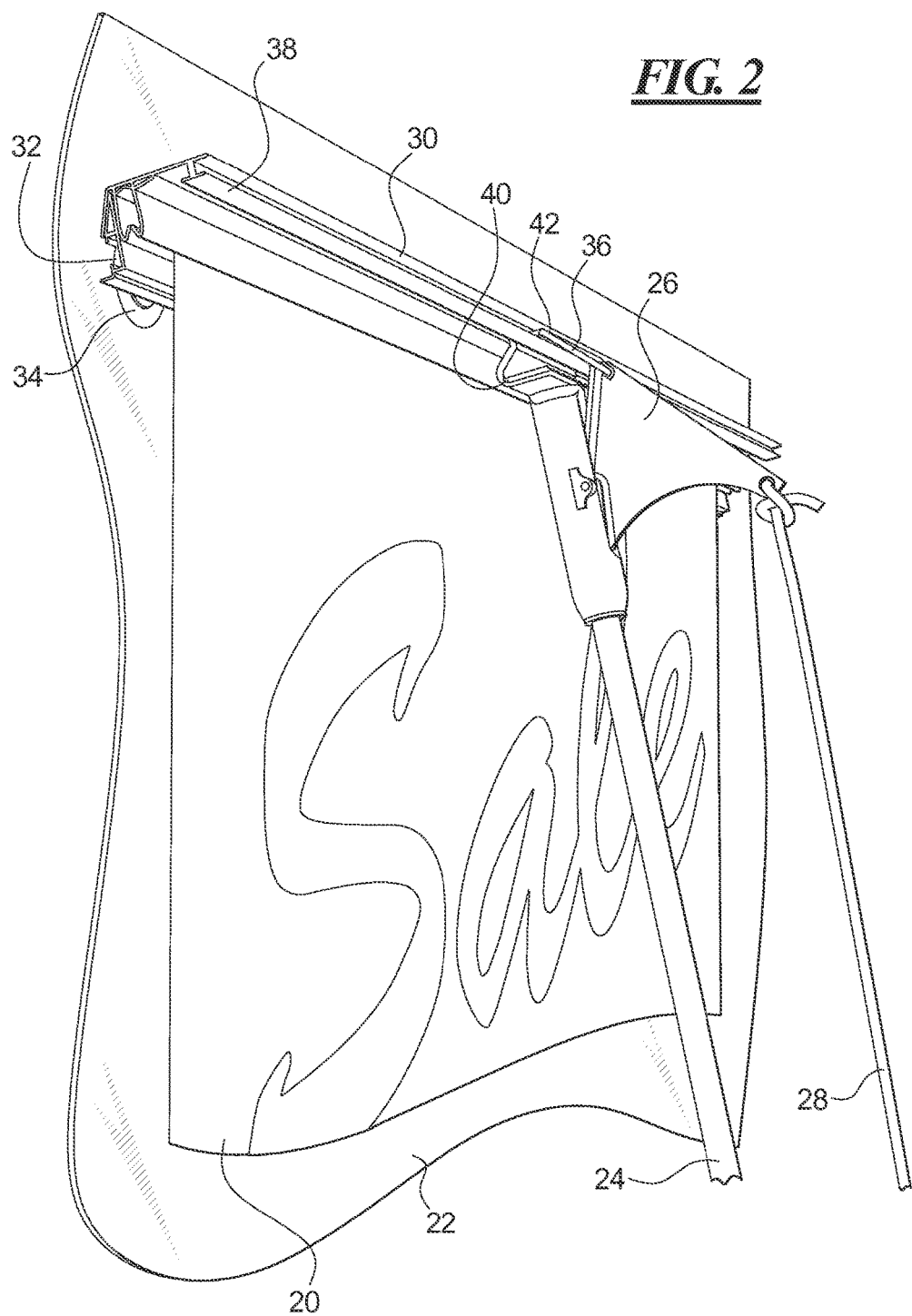
FIG. 2 is a side perspective view of sign as it is hung on a window and prior to release of a gripper and pole, the view also showing the removal of the sign from the window or other vertical surface.

Turning to FIG. 2, the user has positioned the cleat 30 in position on the track 32. With the cleat 30 on the track 32, the user may pull on the rope or cord 28 to open a gripping jaw 36 of the gripper 26. With the gripping jaw 36 open, the gripper 26 may be removed from the cleat 30, leaving the cleat 30 on the track 32 and the banner 20 in place at a display position.

Removal of the banner 20 from the display position is illustrated by FIG. 2 as well. The user moves the pole 24 to position the gripping jaw 36 of the gripper in position at an offset grip member 38 of the cleat 30. The offset grip member 38, is offset from the banner 20 by a distance sufficient to permit a fixed jaw 40 of the gripper 26 to engage the offset grip member 38 without interference from the banner 20. A movable jaw 42 of the gripper 26 is opened by pulling on the rope or cord 28 to engage the offset grip portion 38. Release of tension on the rope or cord 28 permits the gripper 26 to grip the offset grip portion 38 so that the cleat 30 is held in the gripper and may be lifted from the track 32 in a slightly upward motion. The banner 20 may be taken down, exchanged for another, moved to a different position on the track 32 or to a different track or window or wall, as desired.

The banner 20, or other sign or display, is mounted directly in the cleat 30 with no gap between the banner 20 and the cleat 30. Display area is maximized without losing display area by requiring a gap between the cleat 30 and the banner 20, for example, to engage the cleat 30 by the gripper 26. Further, no additional hanging hardware is required, unless desired, between the cleat 30 and the banner 20.

If the track 32 is positioned at a location that can be reached safely by the user, it is possible that the cleat 30 may be positioned on the track 32 without the use of the pole 24 and gripper 26. For example, the user may grasp the cleat 30 by hand and position it on the track 32.

Figure 3:
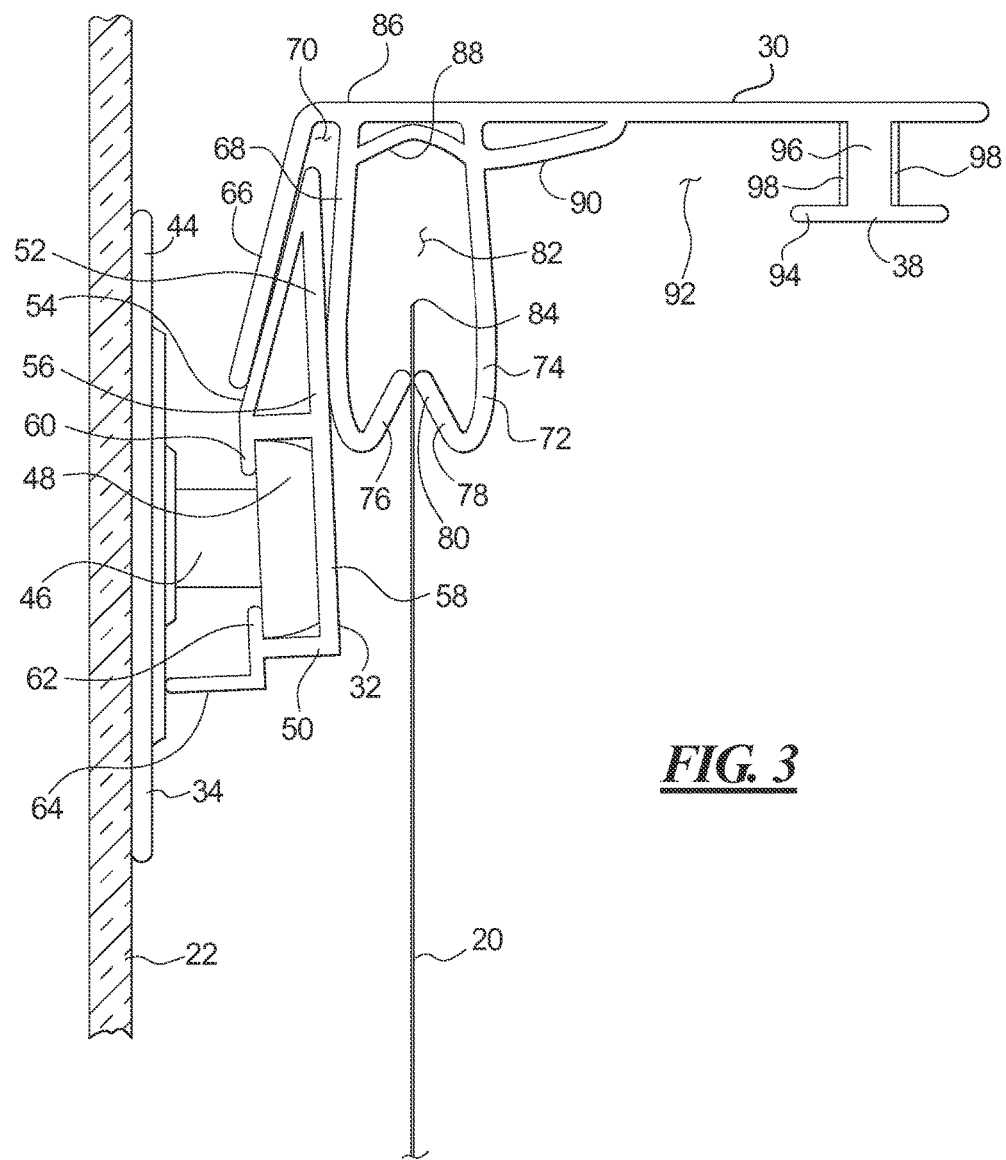
FIG. 3 is an enlarged end view of a track and cleat banner hanger mounting a banner on a window.

FIG. 3 shows the banner 20 mounted on the window 22. The suction cup 34 is adhered to the window 22 by being pressed onto a surface of the window 22 so that a cup portion 44 is flattened or nearly flattened against a surface of the window 22, expelling air from between the cup portion 44 and the window. The perimeter of the cup portion 44 seals against the smooth surface of the window, or other smooth surface, and keeps the suction cup 34 in place. The suction cup 34 includes a stem portion 46 to which is attached a button portion 48. The button portion 48 is held in a channel 50 of the track 32. The track 32 is thereby firmly supported on the suction cup 34. Any number of suction cups 34 may be provided in the channel 50. The suction cup 34 may be moved along the channel 50, added to the channel 50, or removed from the channel as needed. As noted above, other mounting means may be provided, including mounting means attached in the channel 50 of the track 32.

The track 32 includes a vertical projection 52 extending upwardly from the channel 50. The vertical projection 52 is formed of first and second planar members 54 and 56 joined to one another at a sharp or narrow angle to form a thin, fin-shaped vertical projection 52. The planar member 56 forms a back 58 of the channel 50 and the planar member 54 form a front engaging portion 60 of the channel 50. A second front engaging portion 62 of the channel 50 connects to an L-shaped bracket 64. The L-shaped bracket 64 bears against the back of the cup portion 44 of the suction cup 34 to tilt the track 32 toward the window 22. Tilting of the track 32 when the cleat 30 is on the track 32 while holding the sign 20 keeps the cleat 30 is a more level position. Tilting of the track 32 when the cleat 30 is not on the track 32 causes the fin-shaped vertical projection 52 to be disposed near the window 22, facilitating engagement of the vertical projection 52 by the cleat 30.

The L-shaped bracket 64 is not needed in many embodiments. For example, the track 32 may be configured to position the track projection for ease of engagement by the cleat without the use of the L-shaped bracket. In certain embodiments, the projection on the track may be tilted away from the window or other vertical surface, or may be directed parallel to the window, instead of being tilted toward from the window as in the illustrated embodiment. The track may be configured for holding the cleat at a desired angle or position without requiring an L-shaped bracket. All such embodiments of the track are within the scope of the present invention.

The cleat 30 includes a track engaging projection 66 disposed at an angle to a first banner holding wall 68 that defines a track engaging space 70 between the projection 66 and wall 68. The vertical projection 52 of the track 32 fits into the track engaging space 70, either partially or fully seated therein. The track engaging space 70 conforms generally to the shape of the vertical projection 52 of the track 32. The outside surfaces of the projection 52 frictionally engage the inside surfaces of the track engaging space 70 to prevent inadvertent sideways movement of the cleat 30 on the track 32. The track engaging space 70 may be configured to engage the track 32 more tightly or completely as more force is placed on the cleat 30, for example by a larger or heavier banner 20. The heavier the banner 20, the deeper the projection 52 is pushed into the track engaging space 70.

Adjacent the track engaging space 70 is a banner holding element or banner holder 72. The banner holding element 72 of the illustrated embodiment includes the first banner holding wall 68 and a second banner holding wall 74. The first and second banner holding walls 68 and 74 are generally parallel to one another. The walls 68 and 74 have inwardly bent portions 76 and 78 that are extended into contact with one another, or at least nearly into contact with one another, and that form a frictional inwardly directed banner accepting channel 80. An edge 84 of a banner 20 or other sign, display or other item is positioned in the banner accepting channel 80 and pressed inwardly until the edge 84 of the banner 20 passes between the inwardly bent portions 76 and 78 and the edge 84 of the banner 20 enters the space 82 between the walls 68 and 74. The inwardly bent portions 76 and 78 press toward one another with sufficient force to bear against the banner and hold the banner 20 in the banner holding element 72.

Other shapes and types of banner holding elements or banner holders are possible, examples of which will be illustrated hereinafter.

The track engaging projection 66 and first banner holding wall 68 connect to one another at a top plate 86. The top plate 86 forms a top surface of the cleat 30 to which many elements of the cleat 30 are attached. The second banner holding wall 74 extends from the top plate 86. A first reinforcement gusset 88 extends between the first banner holding wall 68 and the second banner holding wall 74. A second reinforcement gusset 90 extends from the second banner holding wall 74 to the top plate 86. The gussets 88 and 90 maintain the banner holding walls 68 and 74 firmly in position.

Between the second banner holding wall 74 and the offset grip member 38 is a gap 92. The gap 92 provides clearance for the fixed jaw 40 of the gripper 26 to engage the offset grip member 38. The offset grip member 38 includes a transverse member 94 and a connecting web 96 extending from the top plate 86 to the transverse member 94. In cross section, the transverse member 94 and the connecting web 96 have an inverted T-shape, and may be referred to as a T-bar.

The gripper 26 shown in FIGS. 1 and 2 engage the cleat 30 at the T-bar by gripping on opposite side surfaces of the connecting web 96. The transverse member 94 keeps the gripper 26 from slipping off the T-bar. In certain embodiments, soft rubber coatings 98 are provided on the opposite surfaces of the connecting web 96 to provide purchase, or mechanical hold, on the connecting web 96 by the gripper 26. The soft rubber coatings 98 enhance the friction between the cleat 30 and the gripper 26 so that the cleat 30 is less likely to slip in the gripper 26, such as during lifting of the cleat 30 and banner 20 to a display location or removal from the display location.

Figure 4:
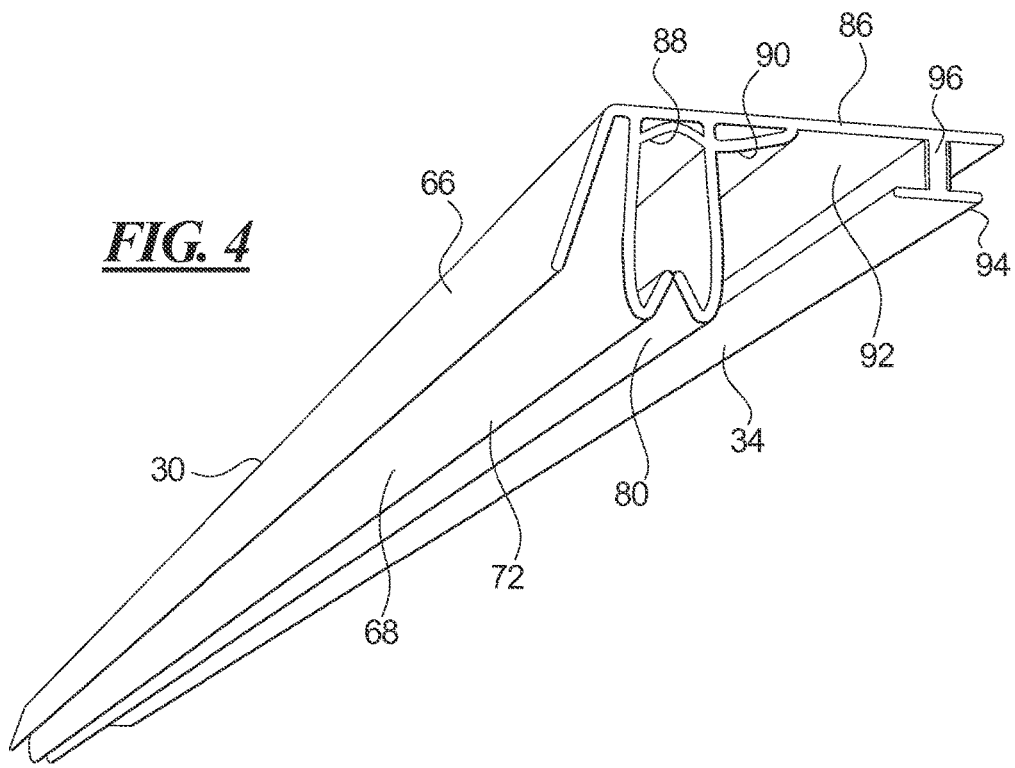
FIG. 4 is a bottom perspective view of the cleat for mounting a banner, sign or display to a vertical surface.

With reference now to FIG. 4, the cleat 30 is shown ready to accept a banner 20 and ready to be mounted on a track 32. The track engaging projection 66 is a wall disposed at an angle to the top plate 86 and extending outwardly from a side of the cleat 30. The banner holding element 72 is adjacent to the track engaging projection 66. The banner 20 is held next to the window or other vertical surface. The weight of the banner is supported close to the track 32 to urge the cleat 30 onto the track 32 and avoid tipping of the cleat 30 from the weight of a heavy banner. The cleat 30 of certain embodiments is as long, or longer, than the width of the banner 20 to be hung by the cleat. It is possible that multiple cleats 30 may be provided on a long banner. Use of multiple cleats for a banner may prevent the single motion by a single lifting pole to lift the banner into place that is possible by a banner mounted in a single cleat.

Figure 5:
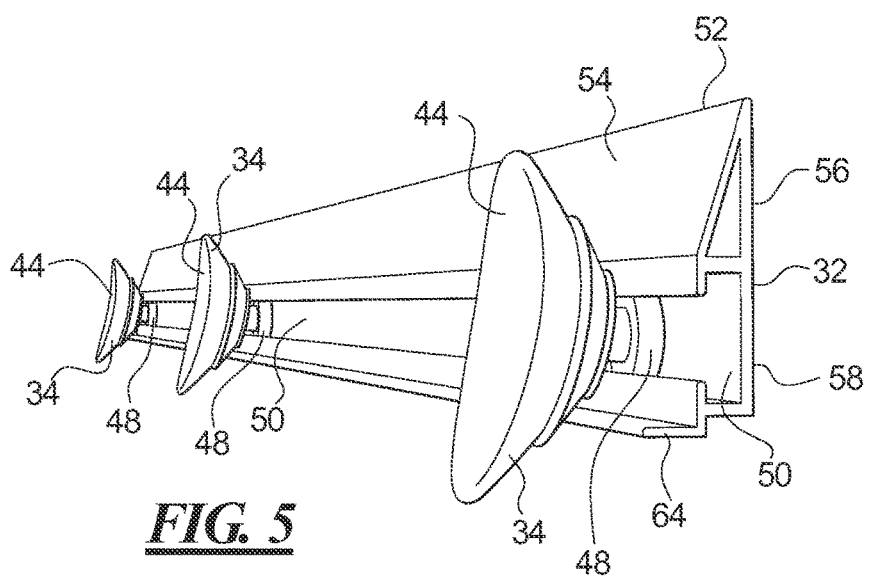
FIG. 5 is a side perspective view of the track for mounting on a window or other vertical surface and for engagement with the cleat of FIG. 4.

In FIG. 5, the track 32 is shown with three of the suction cups 34. More or fewer suction cups may be provided. For heavier banners or longer tracks, more suction cups 34 may be provided. When the suction cups 34 are not affixed to a window or other smooth surface, the L-shaped bracket 64 slightly deforms the cup portions 44 of the suction cups 34. The L-shaped bracket 64 tilts the track 32 toward the window so that the vertical projection 52 may easily be engaged by the cleat 30, for example, by moving the track engaging portion 66 against the window above the track 32 and sliding the cleat down the window surface until the cleat 30 selectively engages the track 32.

The suction cups 34 are provided in the channel 50 of the track 32. The button portion 48 of the suction cups 34 may be moved along the channel 50 to reposition the suction cups, to add more suction cups, or to remove or replace the suction cups. Damaged or aged suction cups 34 can be easily replaced by new, pliable suction cups as needed.

The suction cups 34 of certain embodiments each include a tab extending from the edge of the cup portion 44 by which a user may lift the edge of the cup portion 44 from the window to release the suction. Other means for releasing the suction cups 34 are also possible.

The suction cups 34 may be replaced by or supplemented with other mounting devices. For example, mounting bolts, screws, anchor bolts, adhesively mounted elements, magnets, adhesive, hooks, hook and loop fasteners, or other attachment devices may be provided for mounting the track 32 onto a vertical or generally vertical surface, such as a wall, door, window, post, column, support member, or the like.

The track 32 may be a single elongated track of sufficient length to engage and support the cleat 30. For example, the track 32 may be the same length as the cleat, or may be shorter or may be longer. The track 32 may be one of several such tracks positioned on the vertical surface along a line so that the cleat 30 may be mounted on the vertical surface by engaging the cleat 30 on several of the tracks 32 in the line. The tracks 32 may be shorter than the track show in the figure, so that the cleat engages a series of short tracks to mount the banner or other display.

The track 32 and cleat 30 of certain embodiments may be formed of plastic, such as white plastic or translucent or transparent plastic. The track and cleat may be formed of other colors or other materials such as wood or metal. The track 32 and cleat 30 may be formed by extruding, molding or by other methods for forming.

Figure 6:
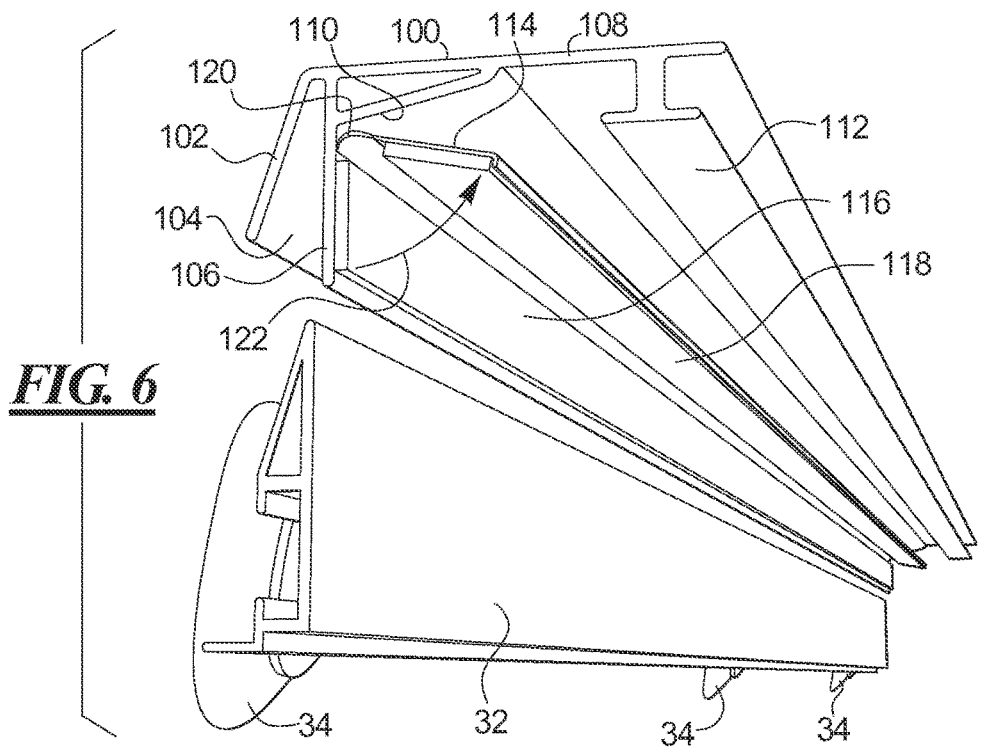
FIG. 6 is a side perspective view of another embodiment of the track and cleat banner hanger.

FIG. 6 shows a track 32 and cleat 100 of a second embodiment. The track 32 is substantially the same as that described previously. The cleat 100 includes a track engaging projection 102 that defines a track engaging space 104 with a banner holding wall 106. The banner holding wall 106 extends from a top plate 108. The top plate 108 supports a gusset 110 that supports the banner holding wall 106 and the offset grip member 112 by which the cleat 100 may be gripped by the gripper 26.

A banner, sign, or display 20 is held by a magnetic banner holder 114. The magnetic banner holder 114 includes a first magnet strip 116 attached to the banner holding wall 106 on an opposite side from the track engaging space 104. A second magnet strip 118 is mounted on a flex strip 120 on which the second magnet strip 118 having matching polarity to the first magnet strip 116 may be pivoted to an open position away from the first magnet strip 116 as indicated by an arrow 122. When in the open position as shown, an edge 84 of a banner 20 may be placed between the magnet strips 116 and 118. The flex strip 120 extends on the back of the second magnet strip 118 and by a flex portion extends to the banner holding wall 106, where is may be attached directly or may be affixed behind the first magnet strip 116.

Figure 7:
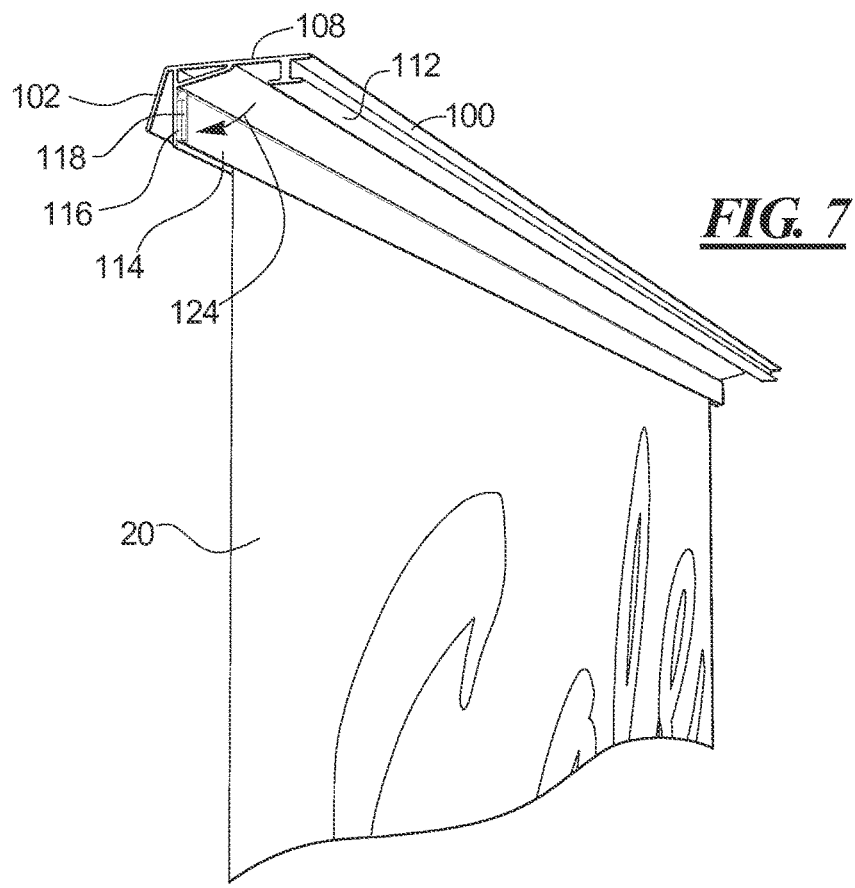
FIG. 7 is a fragmentary side view the cleat banner hanger of FIG. 6 holding a banner.

In FIG. 7 is shown the cleat 100 with a banner 20 mounted in the magnet banner holder 114. The second magnet strip 118 is pivoted in the direction of the arrow 124 so that the second magnet strip 118 magnetically engages the first magnet strip 116, holding the magnet strips tightly together and gripping the banner 20 in between. The offset grip member 112 may be grasped by the gripper 26 and the banner 20 and cleat 100 lifted into position on a track 32 attached to a window 22 or other generally vertical surfaces.

Figure 8:
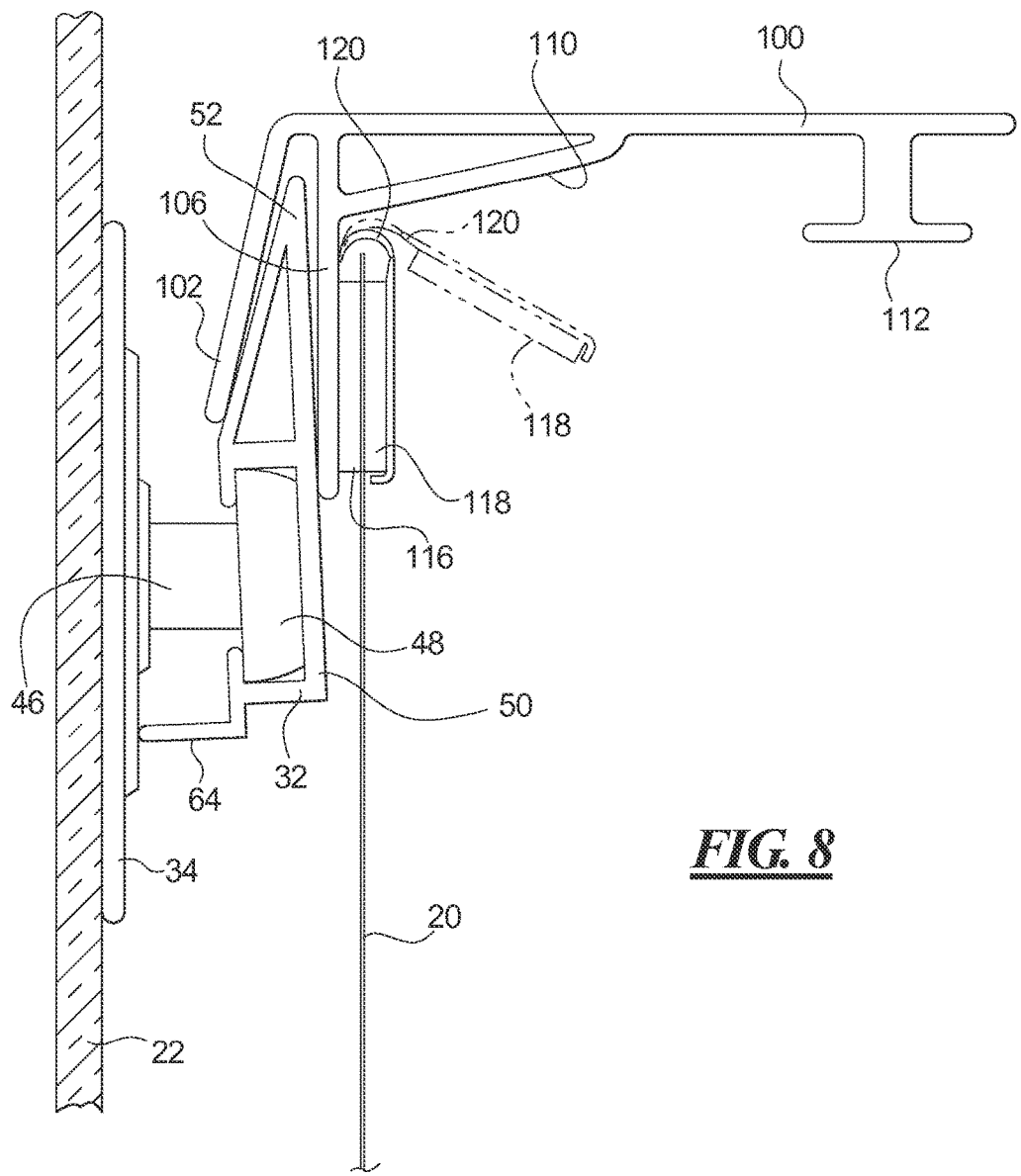
FIG. 8 is an enlarged end view of the track and cleat banner hanger of the embodiment of FIG. 6 shown attached to a window and holding a banner.

FIG. 8 shows the cleat 100 with the first magnet strip 116 and the second magnet strip 118 gripping the banner 20 by magnetic attraction between the strips 116 and 118. The flex strip 120 is flexed into an inverted U shape. The banner 20 is held at a window 22 by attaching the cleat 100 to the track 32 that is fastened to the window 22 by the suction cup 34. The cleat 100 and banner 20 is positioned on the track 32 by gripping the offset grip member 112 with a gripper 26 on the pole 24 and positioning the cleat 100 on the track 32.

Removal of the banner 20 is accomplished by gripping the cleat 100 at the offset grip member 112, for example, using the gripper 26 and lifting the cleat 100 up and off of the track 32 to disengage the track engaging projection 102 from the projection 52 of the track 32. The cleat 100 is moved to a safe position where it may be manipulated by the user and thereafter the second magnet strip 118 is pivoted away from the first magnet strip 116, as shown by the dotted outline. The banner 20 is no longer held by the cleat 100 and may be removed and/or replaced.

Figure 9:
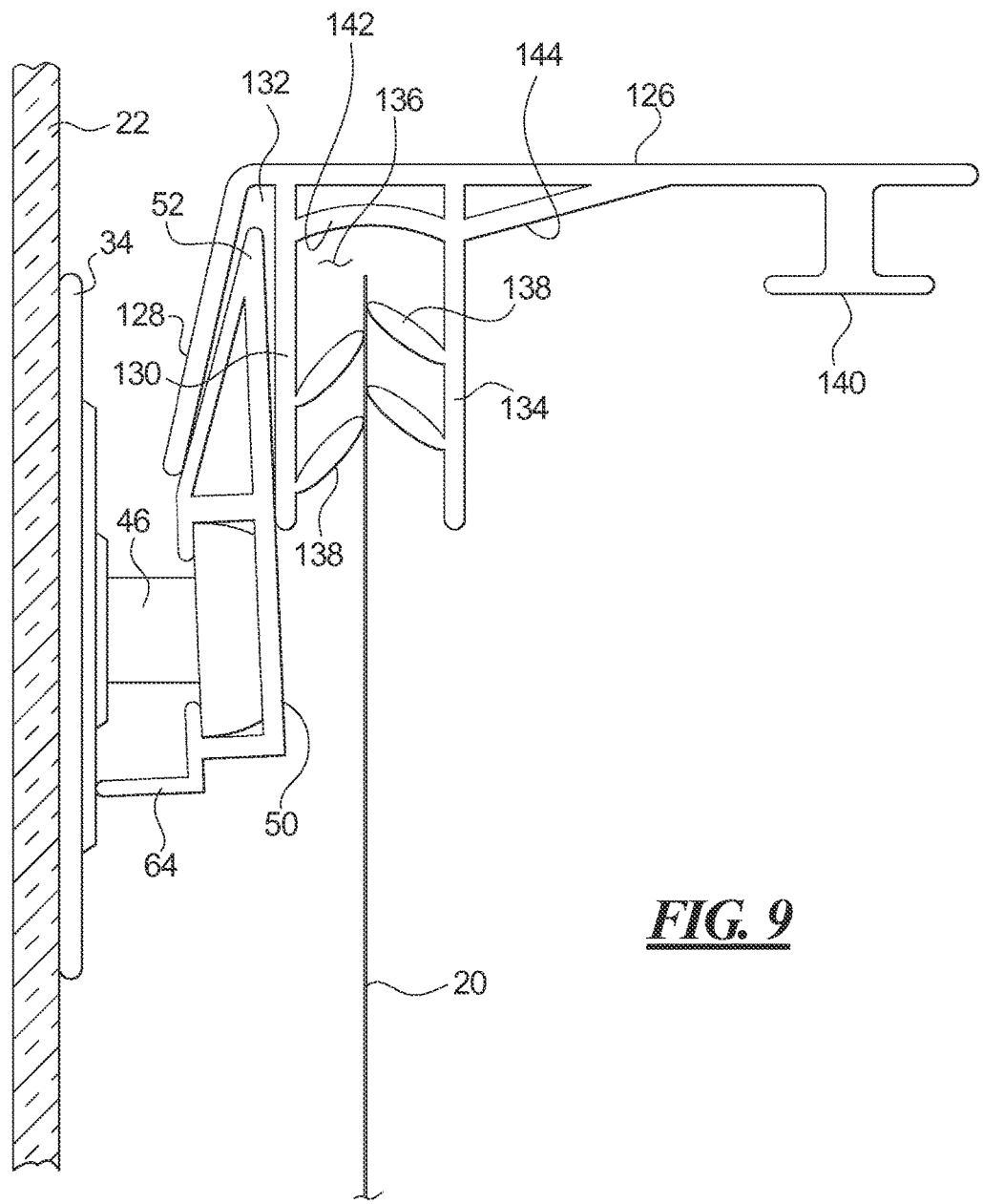
FIG. 9 is an enlarged end view of an embodiment of a track and cleat banner hanger of a third embodiment.

A third embodiment of a cleat 126 is shown attached to the track 32 at a window 22 in FIG. 9. The cleat 126 has a track engaging projection 128 and first banner holding wall 130 defining a track engaging space 132 for receiving the vertical projection 52 of the track 32. A second banner holding wall 134 is generally parallel to the first banner holding wall 130 to define a banner receiving space 136 between the walls 130 and 134. The banner receiving space is partially occupied by fins 138 that extend from the walls 130 and 134 at an angle away from an opening between the lower ends of the walls 130 and 134. The fins 138 are of flexible material, such as rubber or vinyl, that frictionally engages the banner 20 and holds the banner 20 in the cleat 126. The banner 20 is inserted into the banner receiving space 136 between the angled fins 138 so that the fins 138 frictionally engage the banner 20 and hold it in the cleat 126. The banner 20 may be removed by pulling the banner 20 out of the banner receiving space 136 with sufficient force to overcome the frictional engagement by the fins 138. The fins 138 flex to accommodate banners of different thicknesses.

The cleat 126 also includes an offset grip portion 140 that may be engaged by the gripper 26. Gussets 142 and 144 support the banner holding walls 130 and 134.

Figure 10:
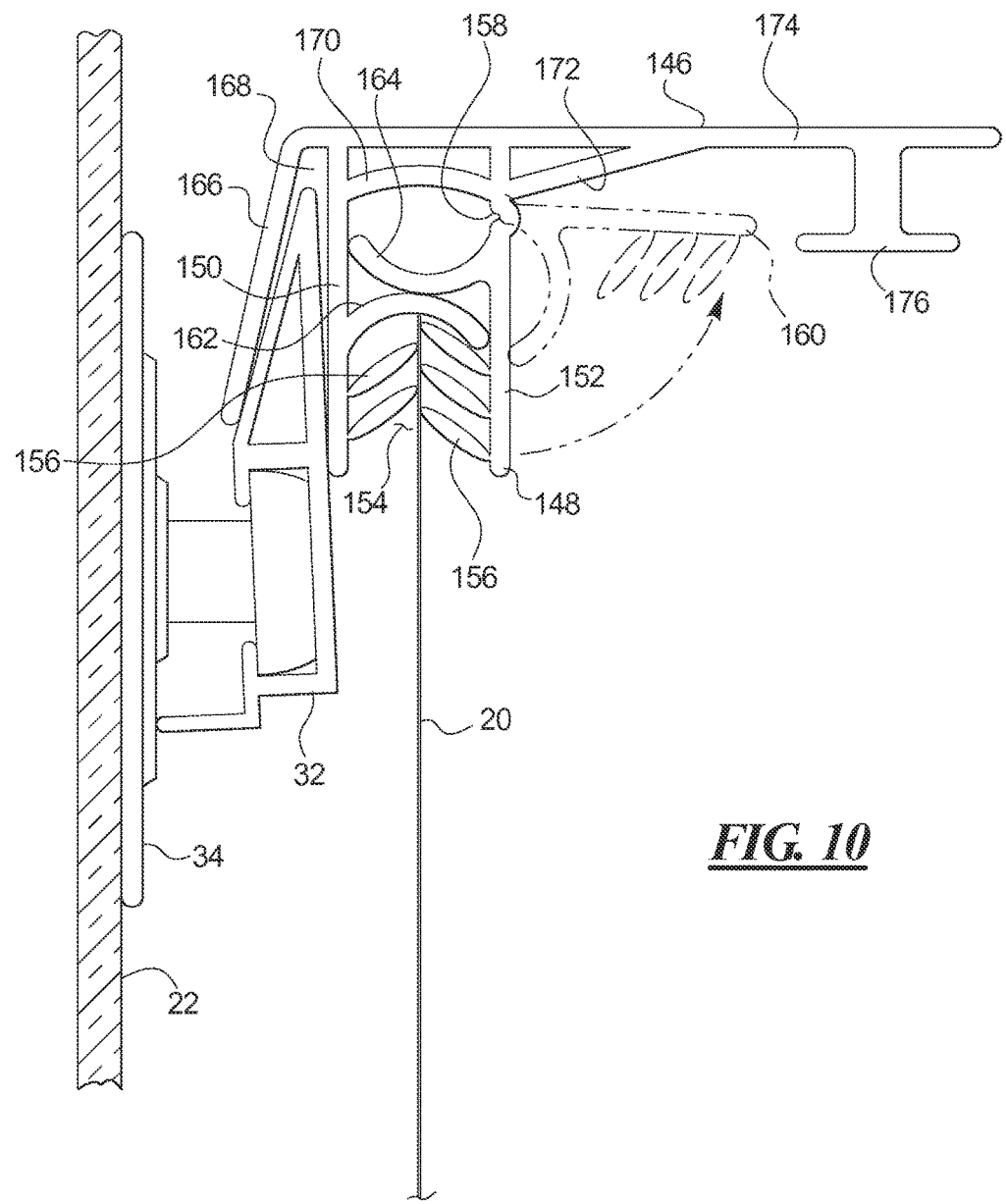
FIG. 10 is an enlarged end view of an embodiment of a track and cleat banner hanger of a fourth embodiment.

A fourth embodiment of the cleat 146 as shown in FIG. 10 includes a banner holding portion 148 formed by a first banner holding wall 150 and a second banner holding wall 152. The banner holding walls 150 and 152 define a banner holding space 154 in which an edge 84 of the banner, sign, or display 20 is held. The banner holding walls 150 and 152 include inwardly directed, angled fins 156 that extend into contact with the banner 20 and hold it in place.

The second banner holding wall 152 includes a hinge portion 158 that is flexible to permit the second banner holding wall 152 to be moved from a position parallel to the first banner holding wall 150 to a position extending at an angle from the first banner holding wall 150, such as shown in broken outline at 160. The first banner holding wall 150 includes a first curved cam surface 162 that extends into the banner holding space 154. The second banner holding wall 152 includes a second curved cam surface 164 that bears against the first curved cam surface 162 when the second banner holding wall 152 is in the parallel position. Frictional engagement between the cam surfaces 162 and 164 maintains the second banner holding wall 152 in a position in parallel with the first banner holding wall 150 and in firm engagement with the banner 20.

Movement of the second wall 152 to the pivoted, open position requires overcoming the friction of the cams 162 and 164. When the second wall 152 is moved so that the cams 162 and 164 are out of contact with one another, the second wall 152 pivots more freely. The cams 162 and 164 may be shaped to provide an over-center action to urge the second wall 152 toward the first wall 150 when the second wall 152 is in the closed position, as shown in solid lines. The second wall 152 snaps into the closed position when pivoted toward the first wall 150 by the user. The banner holding portion 148 provides a secure attachment to the banner, sign, or display 20 and accommodates banners and the like of different thicknesses and materials.

The embodiment of FIG. 10 includes a track engaging projection 166 that forms a track engaging space 168. The first and second walls 150 and 152 are supported by gussets 170 and 172. The cleat 146 includes a top plate 174 that extends to the offset grip portion 176 by which the gripper 26 may grip the cleat 146.

The track 32 is substantially similar to the tracks described elsewhere herein.

FIG. 11 shows an embodiment of a cleat 178 having a magnetic banner holder 180 formed by a first magnet strip 182 mounted on a first banner holding wall 184 and a second magnet strip 186 having matching polarity to the first magnet strip 182 mounted on a second banner holding wall 188. The first banner holding wall 184 is an extension of a support grid 190 formed of vertical and horizontal grid members that provide a rigid structure on which to support the banner holder 180. The second banner holding wall 188 is connected to the support grid 190 by a flexible web 192. The flexible web 192 flexes as the second banner holding wall 188 and the second magnet strip 186 is moved away from the first magnet strip 182 to open the magnetic banner holder 180, for example, to accept a banner or to release a banner. The first magnet strip 182 is held between ridges 194 on the first banner holding wall 184. A ridge 196 is provided on the second banner holding wall 188.

The support grid 190 connects to a top plate 198 on which are provided a gusset 200, an offset grip portion 202, and a track engaging projection 204. A track engaging space 206 is formed between the track engaging projection 204 and the support grid 190. Rubber gripping strips 208 are provided on the offset grip portion 202. The features and operation of the cleat 178 will be apparent from the descriptions provided herein.

FIG. 12 is an end view of a cleat 210. The cleat includes a first banner holding wall 212 provided with gripping fins 214. A second banner holding wall 216 is pivoted at a flexible portion 218, as shown by the second illustration of the second banner holding wall 216 at the flexed or open position. The second banner holding wall 216 includes gripping fins 220. The gripping fins 214 and 220 are shown at an angle away from an opening between the lower ends of walls 212 and 216.

The banner holding walls 212 and 216 are provided with first and second curved cam surfaces 222 that engage one another when the walls 212 and 216 are parallel and in the closed position and thereby maintain the walls in the closed position to firmly hold a banner or display.

The banner holding walls 212 and 216 are mounted on a support grid 224 that extends from a top plate 226 that has an offset grip portion 228 and a cleat engaging projection 230. Other features and operation of the cleat 210 will be understood from the descriptions herein.

Figure 16:
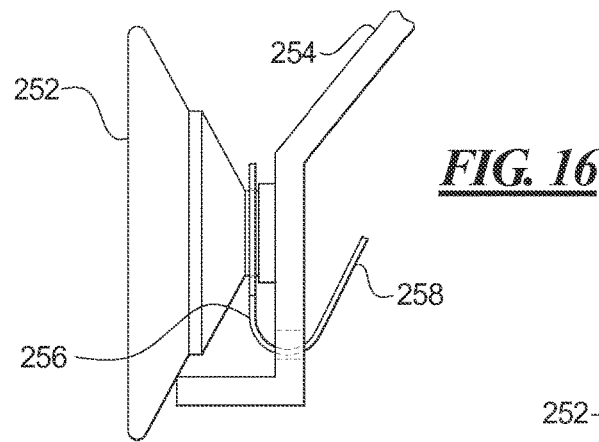
Figure 17:
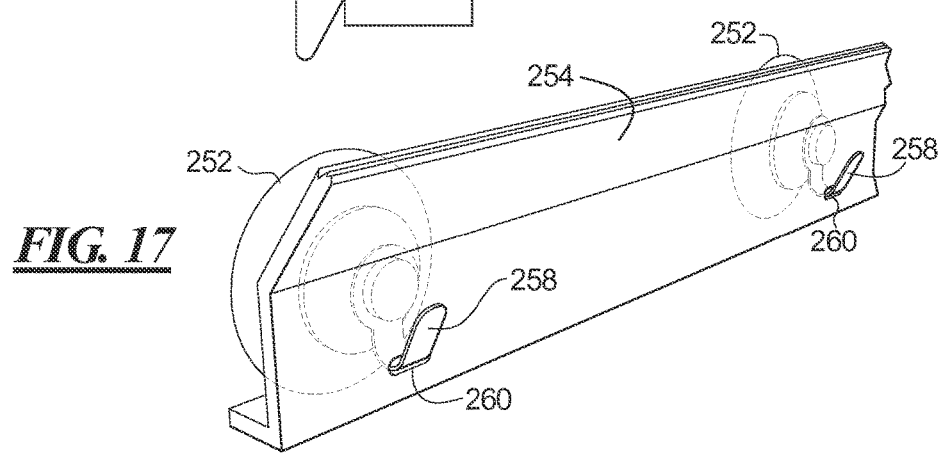
Figure 18:
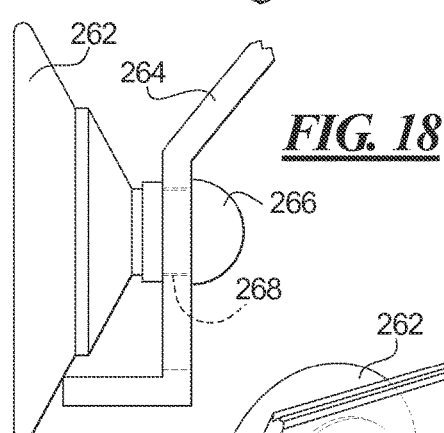
Figure 19:
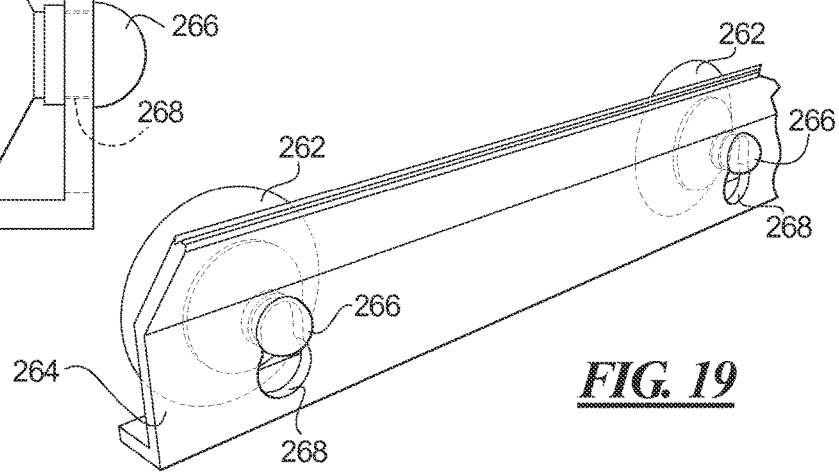

The suction cups may be mounted on the track in various ways. A few examples are shown. The suction cups may be removable from the track so that the track may be removed from a window for cleaning but the suction cups are left on the window. The track may be reattached to the suction cups following the window cleaning. FIG. 13 shows an alternate mounting for a suction cup 232 having a threaded stud 234 on which are provided a threaded nut 236 to seat the suction cup 232 on a track 238. In FIG. 14, a suction cup 240 is held to a track 242 by a removable pin 244. The pin 244 may be a press-in thumb pin. In FIG. 15, a suction cup 246 is held to a track 248 by a threaded screw 250. The screw 250 of certain embodiments is a Phillips head sheet metal screw. In FIG. 16, a suction cup 252 is held to a track 254 by a hook 256 that selectively engages an opening in the track 254. The opening which may be a slot receives an end 258 of the hook 256. A back view of the suction cups 252 mounted on the track 254 with the ends 258 of the hooks received in holes or slots 260 is shown in FIG. 17. A suction cup 262 is shown in FIG. 18 attached to a track 264 by a mushroom head shaped projection 266 extending through a key hole shaped opening 268 in the track 264. A back view is shown in FIG. 19. Two suction cups 262 are provided on the track 264 by the projections 266 extending through openings 268.

Figure 20:
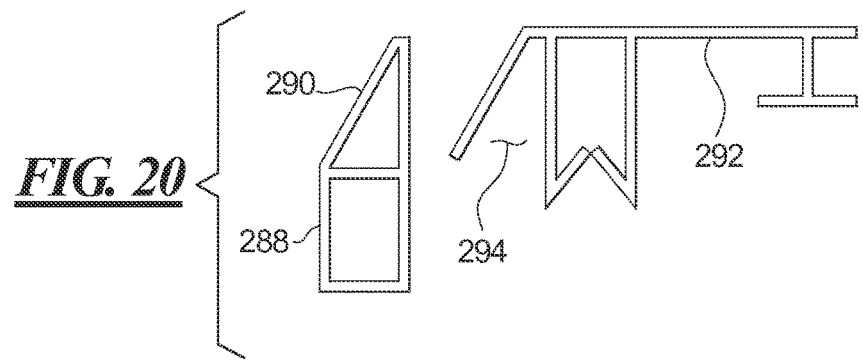
FIGS. 20, 21, 22, 23 and 24 are embodiments of an engagement portion of the track and cleat.
Figure 21:
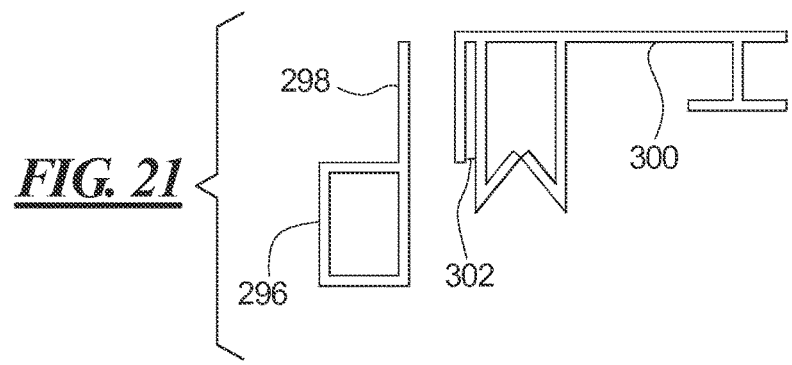
Figure 22:
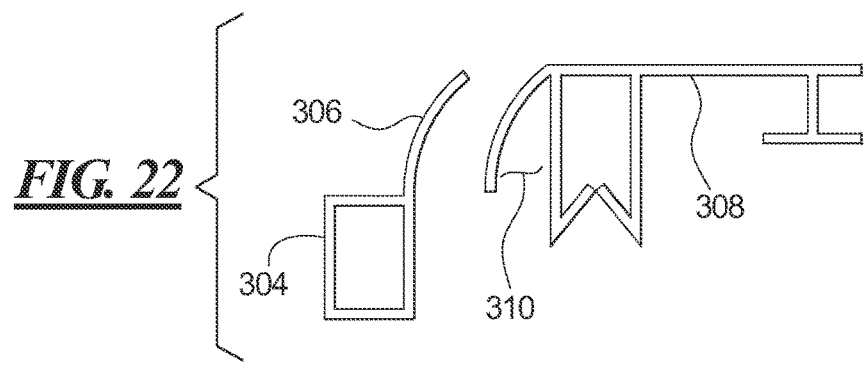
Figure 23:
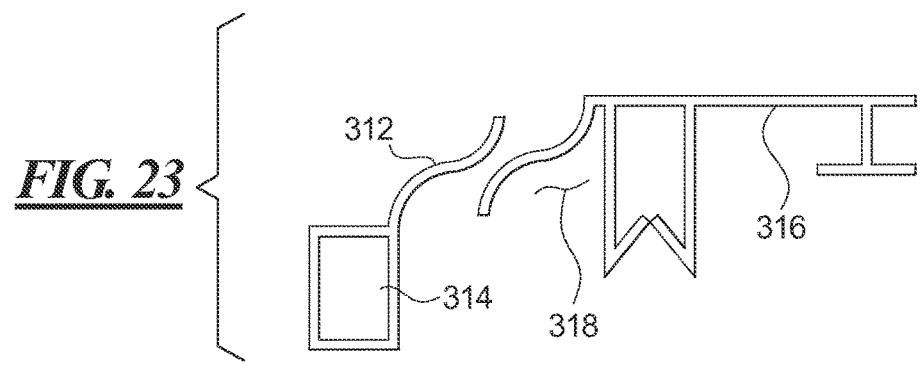

The track and cleat shapes may be varied. A few examples are shown. In FIG. 20, a track 288 having a triangular-shaped connecting section 290 is connected to a cleat 292 having a triangular-shaped track receiving opening 294. The connecting section 290 may be referred to as a wedge. In FIG. 21, a track 296 having a planar connecting section 298 connects to a cleat 300 having a planar shaped track receiving opening 302. FIG. 22 shows a track 304 with a curved connecting section 306 that connects to a cleat 308 having a curved track receiving opening 310. FIG. 23 shows an S-shaped connecting section or serpentine connecting section 312 on a track 314 that connects to a cleat 316 at an S-shaped track receiving opening 318. Other shapes are of course possible.

Figure 24:
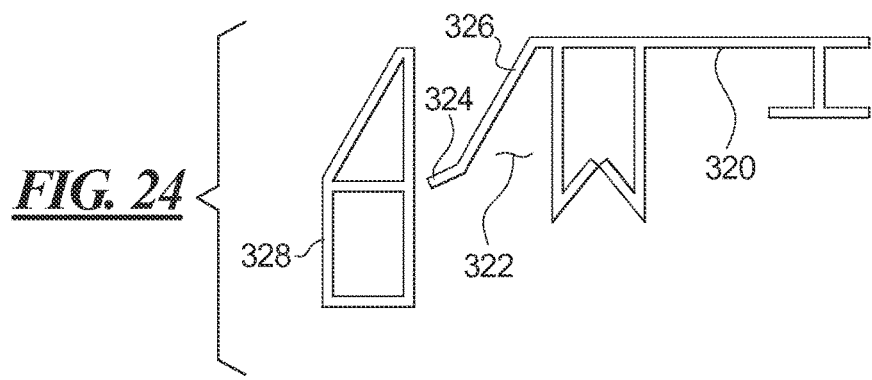

With reference to FIG. 24, the cleat 320 includes a track receiving opening 322 with a guide flange 324 at an end of a track engaging projection 326 to guide a track 328 into the opening 322. The guide flange 324 may be referred to as a lead in, and may be provided along the length of the track engaging projection 326 or at intervals thereon. Such guide elements may be provided on any of the cleats.

Figure 25:
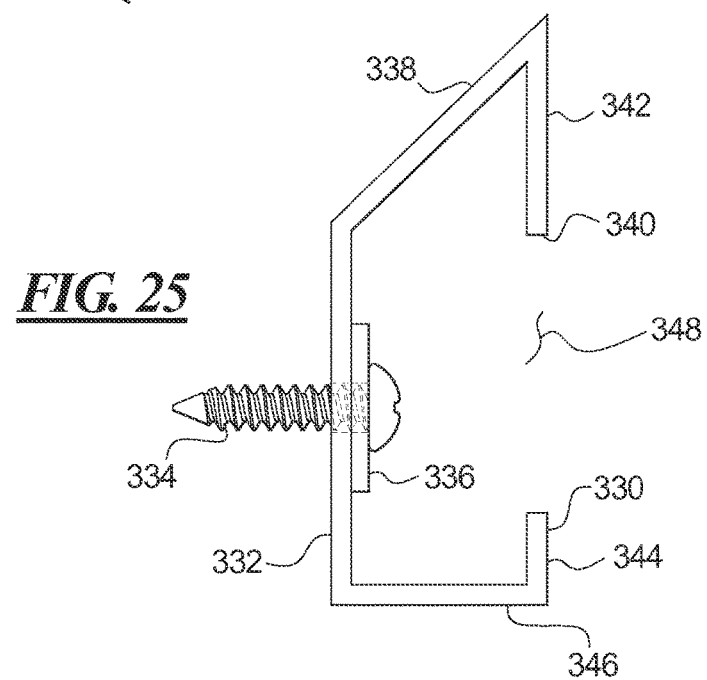
FIG. 25 is an end view of an embodiment of the track.

In FIG. 25 is shown an embodiment of a track 330 that has a flat back surface 332 for mounting to a wall or other vertical surface. The back surface 332 need not be flat in every embodiment. The track 330 is fastened to the wall by a screw 334 that extends through an opening in the flat back surface 332. The track 330 of certain embodiments is an extended member having a plurality of screws 334 extending through a corresponding plurality of holes to hold the track 330 to a wall or the like. In the illustrated embodiment, a washer 336 is provided between the screw 334 and the flat back surface 332. The screw 334 is but one example of a fastener that could be used to attach the track 330 to a wall or other surface. Other fasteners or attachment means are within the scope of the invention.

The track 330 includes an angled projection 338 for engagement by a cleat. A front wall 340 is provided on the track 330 to maintain the upright orientation of the cleat. The front wall 340 includes an upper part 342 extending from the angled projection 338 and a lower part 344 extending from a bottom flange 346. An opening 348 is provided between the upper part 342 and the lower part 344 to provide access to the screw 334 during mounting and un-mounting of the track 330 from a wall or other vertical surface.

Figure 26:
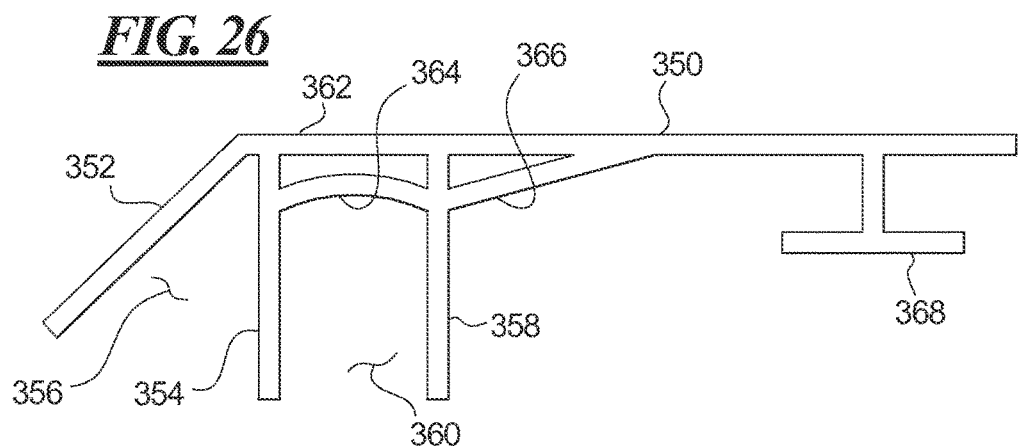
FIG. 26 is an end view of an embodiment of a cleat for use with the track of FIG. 25.

FIG. 26 shows an example of a cleat 350 that may be used with the track 330. Other cleats, such as those shown herein, may be provided. The cleat 350 has a track engaging projection 352 extending at an angle to a first banner holding wall 354 that defines a track engaging space 356. A second banner holding wall 358 is parallel to the first banner holding wall 354 and provides a banner holding space 360 between the walls. The walls 354 and 358 extend from a top plate 362 and are supported in position by a strut 364 and a gusset 366. A grip member T-bar 368 is offset from the banner holding portion. Holes or openings are provided in the banner holding walls 354 and 358. Pins, pegs, posts, rivets, nails, screws, bolts, or other fasteners are positioned through the holes in the first and second banner holding walls and through corresponding openings in the sign or display that has been positioned between the walls and into the banner holding space 360. For example, the sign may be provided with ¼ inch holes adjacent a top edge and similar size holes may be provided in the first and second banner holding walls. The sign is positioned to place the holes in registration, and the pins may be positioned through the aligned holes.

Figure 27:
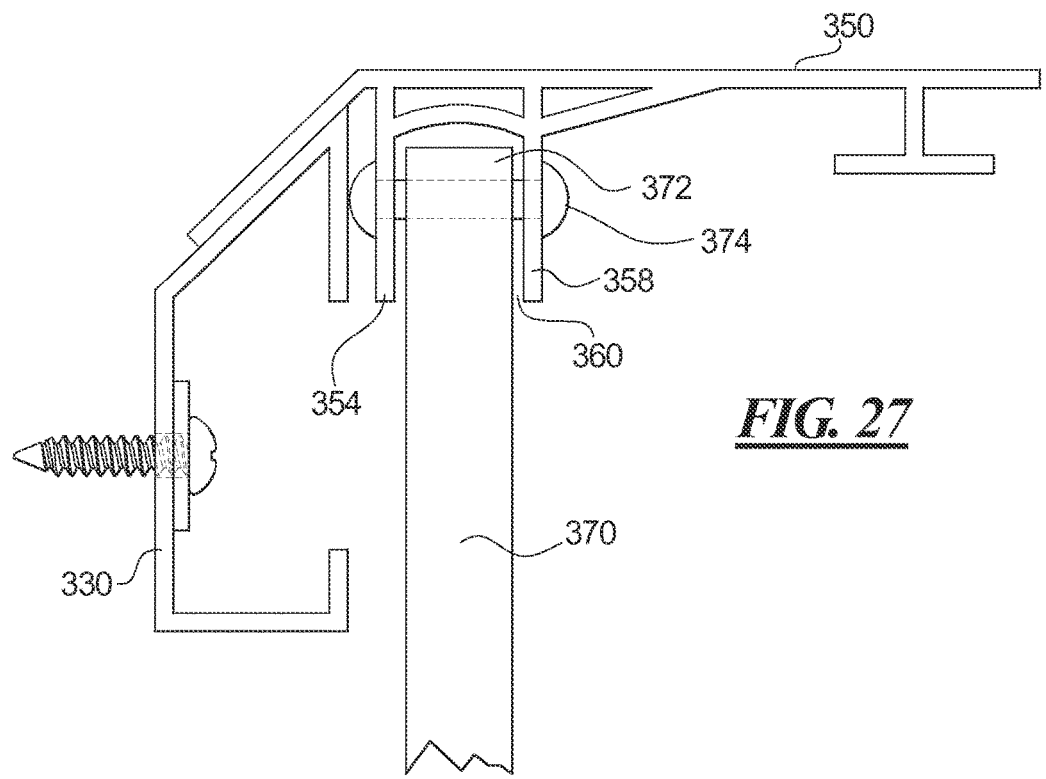
FIG. 27 is an end view of the track and cleat of FIGS. 25 and 26 shown holding a sign.

As seen in FIG. 27, the track 330 is engaged by the cleat 350. A sign 370 is held in the cleat 350. The sign 370 of the illustrated embodiment is of a thicker material, such as a sign of wood, composite, plastic, corrugated material, metal, or other materials. The sign 370 is positioned with a top edge 372 extending into the banner holding space 360. A fastener 374, such a rivet, nail, screw, bolt, pin, post, or other fastener, extends through the first and second walls 354 and 358 and through the sign 370. With the cleat 350 attached to the sign 370, the cleat 350 may be engaged by the gripper 26 and moved into position on the track 330. A sign 370 may be hung at a prominent position and changed as needed for other signs without the use of a ladder. The illustrated cleat 350 may be utilized to mount more long terms signs, for example, on the track 330 or on other tracks shown herein. Other cleats for holding thinner materials such as banners, posters and the like may be used with the track 330.

The sign hung using the embodiment of FIGS. 25-27 may result in the sign standing out from the wall by a distance sufficient to provide a 3D effect of the sign relative to the wall—which may be desirable. For example, the sign may be about one inch from the wall. Blocks may be attached to the back of the sign, for example, to stabilize the sign and make it parallel to the wall. For example, foam blocks may be provided along the bottom of the sign and in the gap between the sign and the wall.

Figure 28:
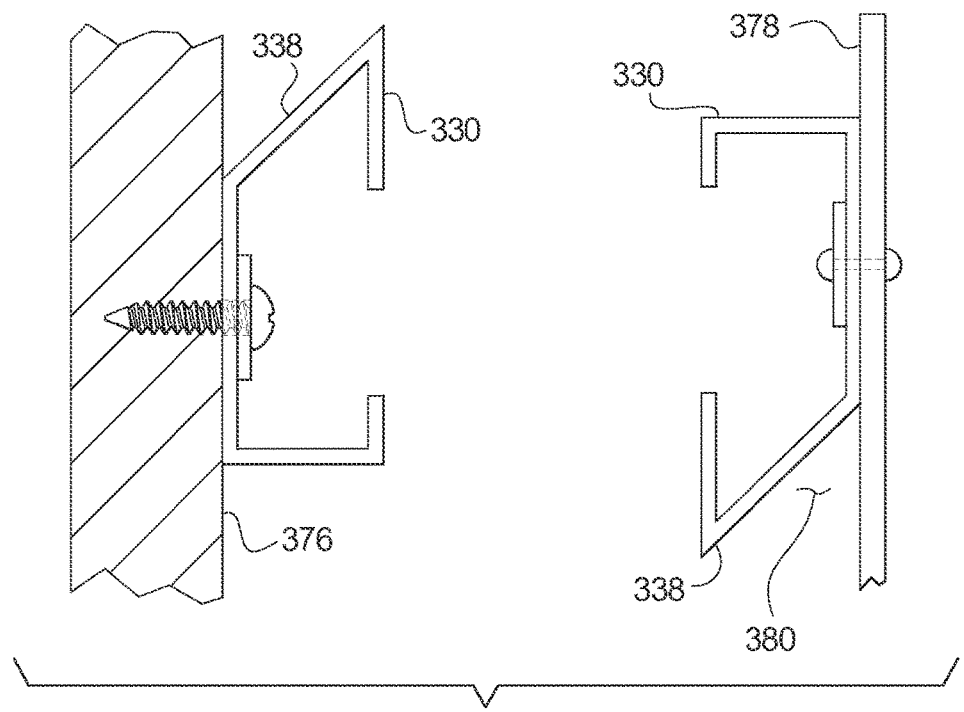
FIG. 28 is an end view of a track and cleat of yet another embodiment.

In FIG. 28, the track 330 may be used on a wall 376 or other vertical surface and a second similar track 330 may be mounted on a back of a sign 378. The angled projection 338 forms a track engaging space 380 between the angled projection 338 and the sign 378. The projection 338 of the track 330 mounted on the wall 376 is received into the track engaging space 380 to mount the sign 378 on the wall 376. A simple mounting system is provided by two similar tracks 330, which may be identical tracks, mounted to the wall and are inverted and mounted to the sign.

Figure 29:
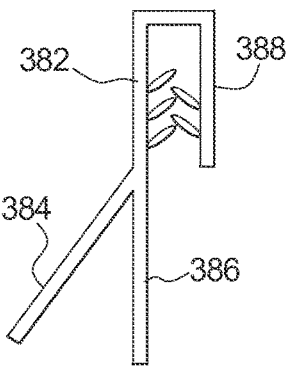
FIGS. 29, 30, 31, and 32 are end views of additional embodiments of a cleat.

FIG. 29 shows an example of a cleat 382 having a track engaging projection 384 and a wall portion 386 defining a space to accept a track. A banner gripper 388 including flexible fins is provided for holding a banner, sign, or display.

Figure 30:
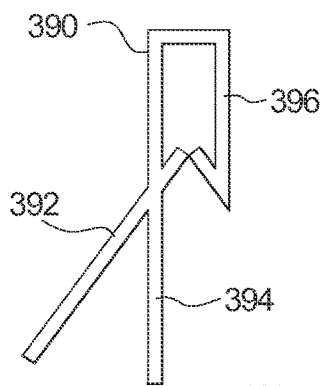

FIG. 30 is a cleat 390 having a track engaging projection 392 and a wall portion 394 defining a space to accept a track. A banner gripper 396 has a pair of inwardly directed arms to engage an edge of a banner, sign or display inserted between the arms.

Figure 31:
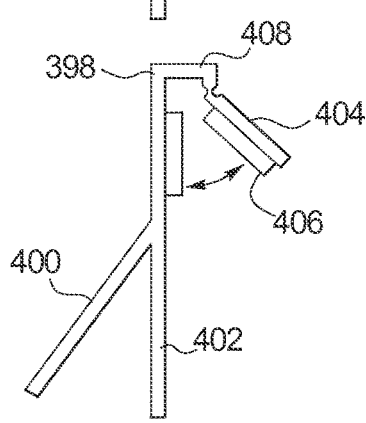
Figure 32:
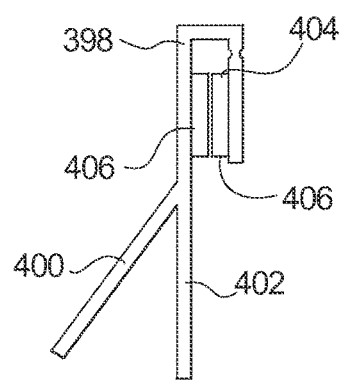

FIG. 31 is a cleat 398 having a track engaging projection 400 spaced from a wall portion 402 defining a space to accept a track. A banner holder 404 includes a pair of strip magnets 406 and a flexible portion 408 so that the magnets 406 may be separated or joined. FIG. 32 shows the magnets magnetically joined to grip a banner, sign or display positioned therebetween. Each of the forgoing cleats may be mounted on a track to hold a sign, banner or display.

Figure 33:
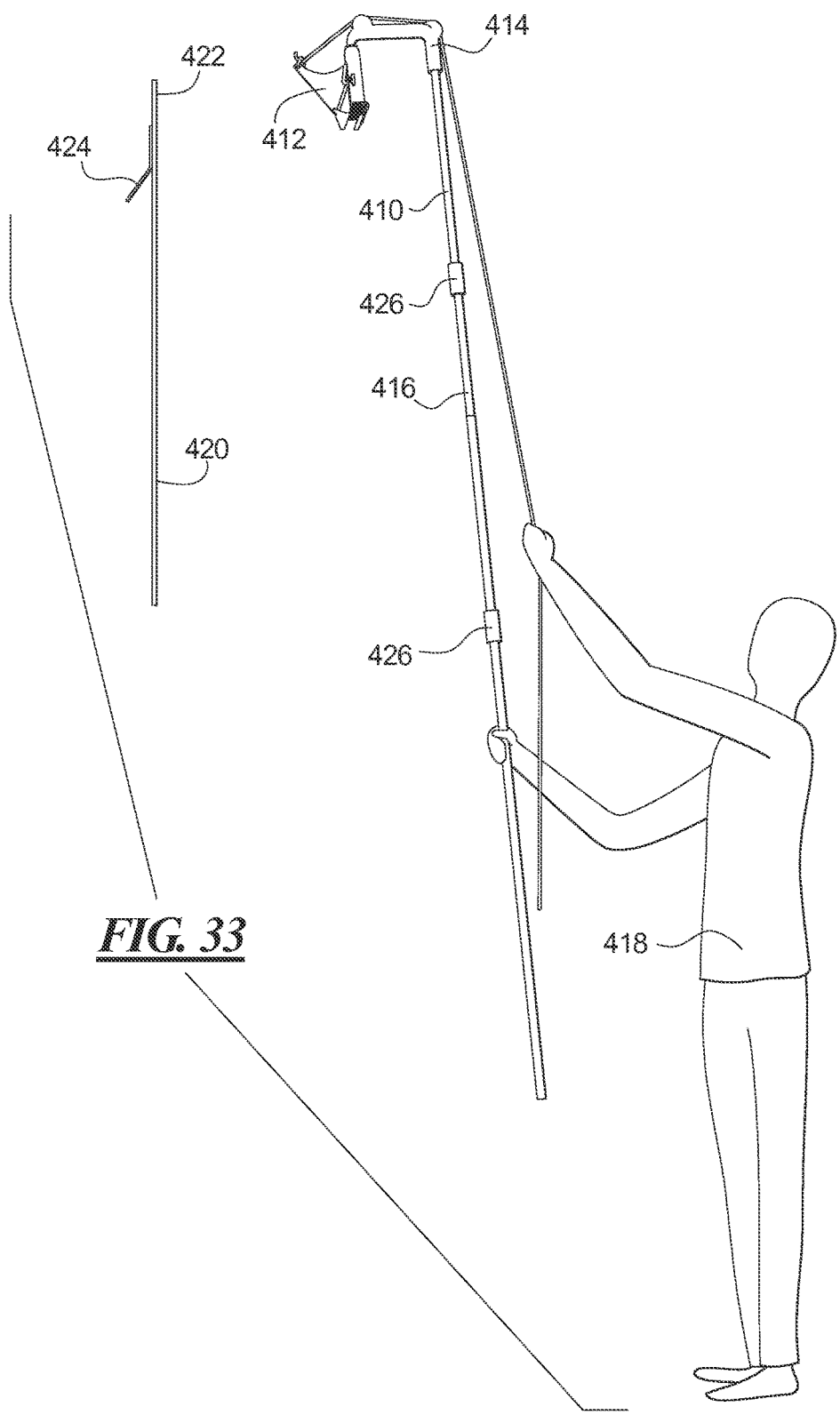
FIG. 33 is a schematic view of a top gripper removal and replacement of a sign having a cleat for mounting on a track.

Some cleats may require a gripper of a different configuration to mount and un-mount the banner without use of a ladder. FIG. 33 shows an example of a top edge gripper 410 that has jaws 412 on a bracket 414 that is mounted on a pole 416. The top edge gripper 410 is configured to grip a cleat from the top, or even to grip the display or sign itself from the top. The jaws 412 are directed downwardly and are operable between closed and open positions to grip and release the cleat or display or sign itself. The gripper 410 includes an apparatus for remotely operating the jaws from the user-held end of the pole 416, for example by a cord or cable, by levers, or by an electronic control. In one example, a user 418 positions the pole 416 to grip a sign 420 or a cleat at a top edge 422. With the sign 420 so engaged, the user uses the pole 416 to lift the sign 420 so as to remove a cleat 424 attached to a back of the sign 420 from a track, such as a track shown elsewhere herein. The sign 420 may be lowered to a position where it may be safely removed from the gripper 410. The sign 420 may also be moved to a different mounting position on the track, or to a different track or location. The sign 420 may be engaged by the gripper and moved into a position for mounting the cleat 424 on a track using the gripper and pole. The pole 416 may be as increased in length by adding extension sections 426. Thus, the sign, banner or other display may be removed from its mounting location or placed at a mounting location using the top gripper 410 safely from floor level.

The cleat 424 of FIG. 33 may be as simple as a first portion attached to the back surface of the sign or display and a second portion at an angle to the first portion, the second portion extending at an angle to the first portion. The second portion defines a track engagement space between the second portion and a back surface of the sign or display. Other configurations of cleats are possible.

A sign, banner, or display may be mounted to a window, wall, or other vertical surface without requiring a cleat that is prominently visible at the top edge of the sign, banner or display. The visible portion of the cleat may be minimized when viewed from the front of the sign, banner or display with only a portion of the banner holder being visible from the front, for example as shown in FIGS. 29-32, or the cleat may be mounted entirely behind the sign, banner or display and therefore not visible from the front of the sign, like the cleat 424 of FIG. 33.

Other grippers may be used to mount and un-mount signs, banners, and displays, including grippers for gripping offset gripping portions of the cleat extending from the banner holder or grippers that otherwise engage the cleat or even that engage a portion of the sign or display edge. The gripper may be configured for gripping a cleat such as one of the cleats shown herein.

The track and/or cleat of the present system may be formed of extruded or molded plastic, wood, metal, fiberglass, glass, cardboard, corrugated plastic, composite fiber, rubber, foam, in solid and/or compressed forms. The track may be attached to a surface by mounting bolts, screws, anchor bolts, hooks, adhesive, glue, hook and loop fasteners, magnet to magnet connection, or magnet to metal connection.

The track and cleat system may utilize modular tracks attached to the surface. For example, a series of one inch to one foot sections of track may be mounted to a window or wall. The track may include fasteners or adapters for attachment to a slat wall, mirrored wall, wood wall, block wall, dry wall, pegboard, or metallic wall. The surface to which the track is attached may be a vertical surface, angled or sloped surface, or a surface having openings. The track and cleat may be mounted above a wall opening or along a wall perimeter soffit opening and configured to suspend the banner at the opening. The track and cleat system may hold the banner close to the glass of a window to reduce reflections or light between the window and banner. The track and cleat may mount a banner or the like on a wall at a distance from the wall to provide a 3D effect, rather than mounting the banner close to a wall or directly against the wall. The track and cleat may be mounted to support columns or pallet rack upright and cross members or shelving units, racks, gondolas or other store or display or merchandising fixtures that have front facing surfaces that are generally vertical or upright in orientation.

The track and cleat system may mount a banner or the like on an imperfectly straight and/or imperfectly flat wall. Irregularities in the wall do not prevent mounting of the banner.

The track and cleat system may be mounted to a window or wall over a restaurant booth, cooking, ordering or serving area, or over store shelves or over a product display, without requiring the user to climb in the booth, or over cooking, ordering or serving areas, or over the shelves or use a ladder or the like to hang the banner or remove the banner.

The track and cleat are held together by gravity and friction. Other configurations are possible to provide a positive engagement between the track and cleat.

Thus, there is shown and described a track and cleat system for mounting signs, displays, and banners to a surface. The banners and the like may be mounted to one or more tracks without the use of a ladder, step stool, or crate. The mounting may be performed safely from floor level with one motion by one individual user. In other words, it is not necessary for the user to lift and hang one side of the banner and then perform a second motion to lift and hang the other side of the banner. Hanging a banner does not require two people to hang the two sides of the banner simultaneously as well. Once the banner is attached in the cleat, the cleat is lifted onto the track and the banner hanging is complete.

Although other modifications and changes may be suggested by those skilled in the art, it is the intention of the inventor to embody within the patent warranted hereon all changes and modifications as reasonably and properly come within the scope of their contribution to the art.

I claim:

1. A hanger for hanging a sign, poster, banner or display, comprising:

a track having a projection and a fastener for fastening the track to a vertical surface;

a cleat having a track engaging projection defining a track engaging space for engaging the track, the cleat including a banner holding element attached to the track engaging projection, the banner holding element is configured to hold a banner, sign, poster, or display;

an offset grip portion spaced from the banner holder element, the offset grip portion being configured for engagement by a gripping jaw of a gripper;

at least one of the banner holding element and the offset grip portion extending laterally of the track.

2. A hanger as claimed in claim 1, wherein the fastener for fastening the track to a vertical surface includes a suction cup.

3. A hanger as claimed in claim 1, wherein the banner holding element includes one of:

a magnetic banner holder, inwardly directed portions extending from opposite banner holder walls substantially into contact with one another, a plurality of fins extending from opposite banner holder walls, and a pivotable banner holder wall pivotably movable relative to a stationary banner holder wall.

4. A hanger as claimed in claim 1, wherein the cleat includes an elongated extruded member having the track engaging projection and the banner holding element and the offset grip portion formed in one extruded piece.

5. A hanger as claimed in claim 1, wherein the track includes:

a channel into which the fastener is engaged; and an L-shaped bracket disposed along an edge of the channel and extending from the channel, the L-shaped bracket engaging the fastener to tilt the projection toward the vertical surface.

6. A hanger as claimed in claim 1, wherein the track includes a plurality of suction cups mounted in a channel of the track.

7. A hanger as claimed in claim 1, wherein the track includes an extruded member having a channel for mounting the fastener, wherein the channel and the projection are formed in one extruded piece.

8. A hanger as claimed in claim 1, wherein the track engaging projection of the cleat includes a wall extending from a sidewall of the banner holding element to define a track engaging space.

9. A hanger as claimed in claim 1, wherein the track is one of a single elongated track element or a plurality of elongated track elements.

10. A hanging system for hanging a banner, poster, sign or display on a surface, comprising:

an elongated pole;

a gripper at an end of the elongated pole, the gripper including a gripping jaw that is selectively movable between an open position and a closed gripping position;

a cleat having:

an offset grip portion configured for engagement by the gripping jaw of the gripper;

a banner holder having first and second banner holder walls, the banner holder being spaced from and attached to the offset grip portion, the banner holder being operable to hold one of a banner, a poster, a sign or a display;

a track engaging projection extending from the banner holder and spaced from the banner holder to define a track engaging space between the track engaging projection and the banner holder; and a track having a plurality of fasteners for fastening to a surface, the track including a projection configured to fit into the track engaging space of the cleat.

11. A hanging system as claimed in claim 10, wherein the cleat and the track are each of extruded members.

12. A method of mounting a banner, poster, sign or display, comprising:

mounting a track to a vertical surface;

affixing a banner, poster, sign or display in a banner holder of a cleat;

attaching a gripper to a grip portion of the cleat;

positioning the cleat at the track using the gripper;

engaging the cleat on the track at a position laterally adjacent to the track; and releasing the gripper from the cleat.

13. A method of un-mounting a banner, poster, sign or display, comprising:

gripping a grip portion of a cleat with a gripper, the cleat holding a banner, poster, sign or display, the grip portion being disposed laterally of a track;

releasing the cleat from the track, the track being mounted on a vertical surface at a mounting location;

moving the cleat from the mounting location with the gripper;

releasing the gripper from the grip portion of the cleat; and removing the banner, poster, sign or display from a banner holder of the cleat.

14. A track and cleat for hanging a banner, poster, sign or display on a window, comprising:

an elongated extruded track having a projection and a channel;

a plurality of suction cups each having a button mounted in the channel of the elongated extruded track, the channel being configured to orient the projection vertically when the suction cups are attached to a vertical surface;

an elongated extruded cleat having a track engaging projection configured for engaging the projection when the suction cups are attached to a vertical surface, the elongated extruded cleat including a banner holding element spaced laterally from the track engaging projection to define a track engaging space between the track engaging projection and the banner holding element, the banner holding element being configured to hold a banner, poster, sign or display, the elongated extruded cleat including an offset grip portion spaced laterally from the banner holding element, the offset grip portion being configured for being gripped by a gripping jaw of a gripper.

15. A track and cleat as claimed in claim 14, wherein the elongated extruded channel includes an L-shaped projection projecting from the channel at an edge opposite the projection.

16. A track and cleat as claimed in claim 14, wherein the projection on the track includes a wedge-shaped projection, and wherein the track engaging space includes a wedge-shaped track engaging space.

17. A track and cleat as claimed in claim 14, wherein the offset grip portion includes a T-shaped projection disposed laterally of the track engaging portion, the T-shaped projection being configured for gripping by a gripper.

18. A track and cleat as claimed in claim 14, wherein the banner holding element includes first and second banner holder walls defining a banner receiving space and having a plurality of fins projecting into the banner receiving space.

19. A track and cleat as claimed in claim 14, wherein the banner holding element includes first and second magnets disposed on opposed walls for holding a banner, poster, sign or display between the magnets.

20. A track and cleat as claimed in claim 14, wherein the banner holding element includes inwardly directed portions extending form opposite banner holder walls, the inwardly directed portions extending at least nearly into contact with one another.

\* \* \* \* \*